March 26, 1968 YUJIRO YAMAMOTO 3,375,439

METHOD AND APPARATUS FOR TESTING MAGNETIC HEADS UTILIZING A VIBRATING WIRE CARRYING CURRENT

Filed Dec. 7, 1964 2 Sheets-Sheet 1

INVENTOR.
YUJIRO YAMAMOTO

BY A. M. Fernandez

ATTORNEY

INVENTOR.
YUJIRO YAMAMOTO

BY *A. M. Fernandez*

ATTORNEY 3,375,439

METHOD AND APPARATUS FOR TESTING MAGNETIC HEADS UTILIZING A VIBRATING WIRE CARRYING CURRENT

Yujiro Yamamoto, Santa Ana, Calif., assignor to North American Rockwell Corporation, a corporation of Delaware Filed Dec. 7, 1964, Ser. No. 416,484
12 Claims. (Cl. 324—34)

The present invention relates to a method and apparatus for testing magnetic heads and more particularly a method and apparatus for determining the dynamic characteristics of magnetic memory heads.

To make a determination of whether the dynamic characteristics of a magnetic head conform to specified minimum standards, the only valid method heretofore known has been to place the head in an operating system. That is an unsatisfactory procedure due to the time and expense required. An added characteristic of the head which should be determined before it is placed in the memory is its electromagnetic alignment. This has heretofore been done by using an optical means for an approximately initial alignment followed by electrical or mechanical realignment after the head is in the operating system.

The initial optical alignment is often inadequate since it sometimes is such a rough approximation that electrical realignment is impossible, and mechanical readjustment is not always possible, as when the head is rigidly fixed in the memory system in order that it be able to withstand severe environmental conditions of shock and vibration.

It is therefore an object of the present invention to provide a method for testing magnetic heads without placing them in an operating system.

Another object of this invention is to provide a method for determining the dynamic operating characteristics of a magnetic head and the location of its magnetic center.

A further object of this invention is to provide apparatus for simulating the operating conditions in which a magnetic head normally functions, and apparatus for testing the response of the magnetic head to said simulated conditions.

These and other objects may be achieved through the use of a fine wire fastened rigidly at two points to simulate operating conditions of a magnetic memory. A high frequency alternating signal is applied to the wire and suitable means is employed to cause the wire to vibrate at a resonant frequency. A DC magnetic field about at least a portion of the wire and an alternating current signal of a frequency equal to the resonant vibration frequency of the wire applied to the wire will cause it to vibrate in the desired manner. The high frequency signal creates a varying magnetic flux pattern about the wire equivalent to magnetic information on a rotatable recording medium. The head to be tested is placed with the center of its gap at the center of the vibrating wire when in its neutral position so that the flux variations moving across the gap simulate a magnetic recording medium cyclically moving past the magnetic head gap.

The information which may be obtained through the use of this apparatus and method in testing magnetic heads includes the following: sensitivity, optimum resolvable digital signal width, head-to-recording-medium separation characteristics, frequency response, magnetic center of the head, and for a double-gap-type head the frequency repsonse and relative output voltage of each gap.

Further objects and advantages of this invention will become apparent from the following description with reference to the accompanying drawings in which.

Figure 3:
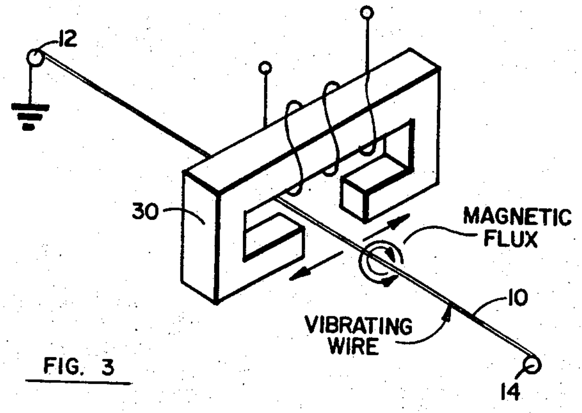
Figure 4:
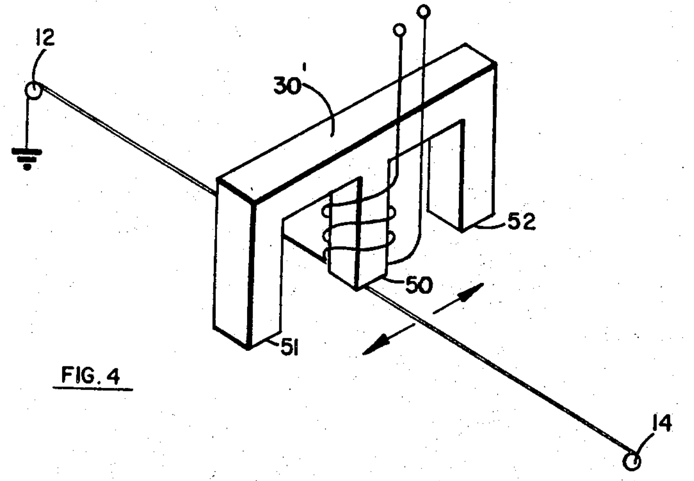
Figures 2, 5:
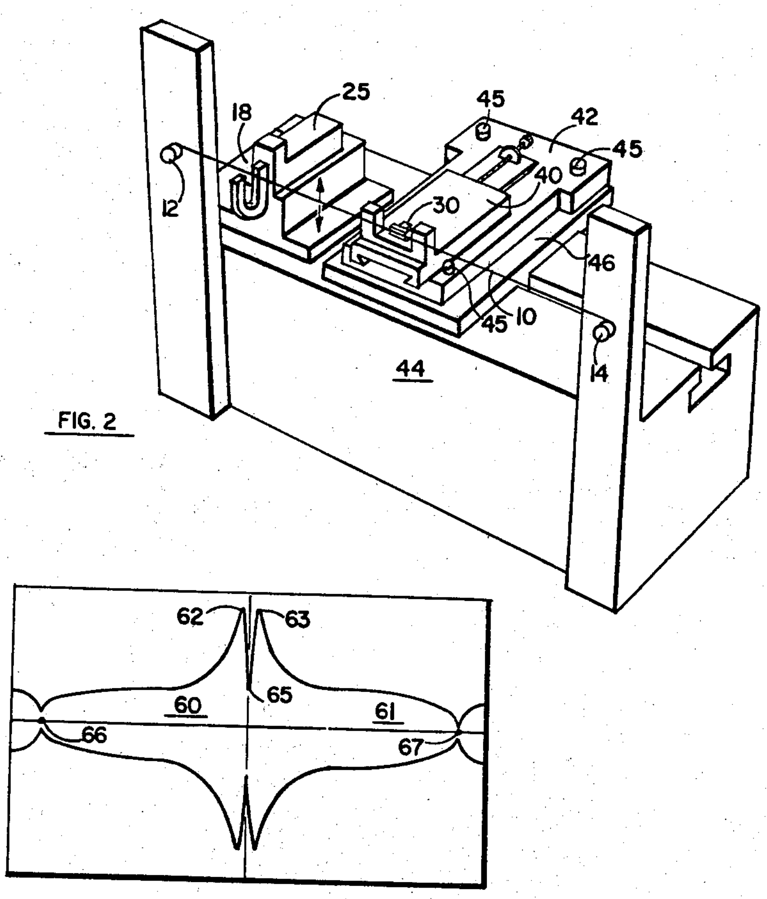
FIGURE 2 is a perspective view of an embodiment of this invention excluding the signal sources and measuring devices schematically illustrated in FIGURE 1.
Figure 6:
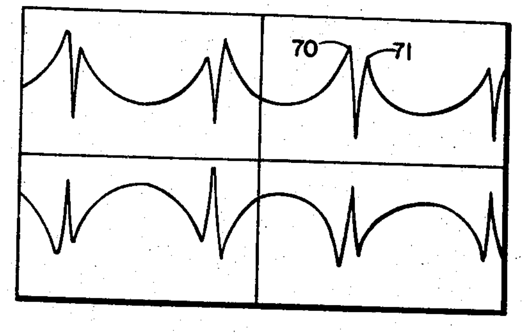
Figure 7:
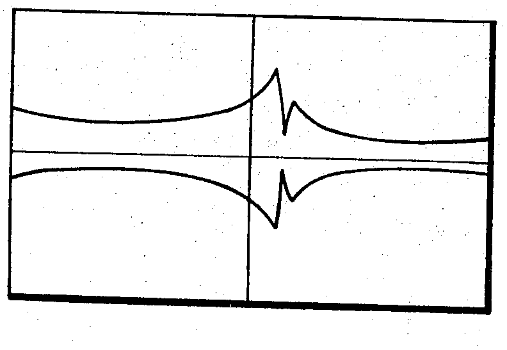

FIGURES 3 and 4 schematically illustrate the relationship between a magnetic head of the single and double-gap type and the vibrating wire in the method of the present invention; and FIGURES 5, 6 and 7 show typical results obtained on the face of an oscilloscope of various magnetic heads under test according to the method of the present invention.

Figure 1:
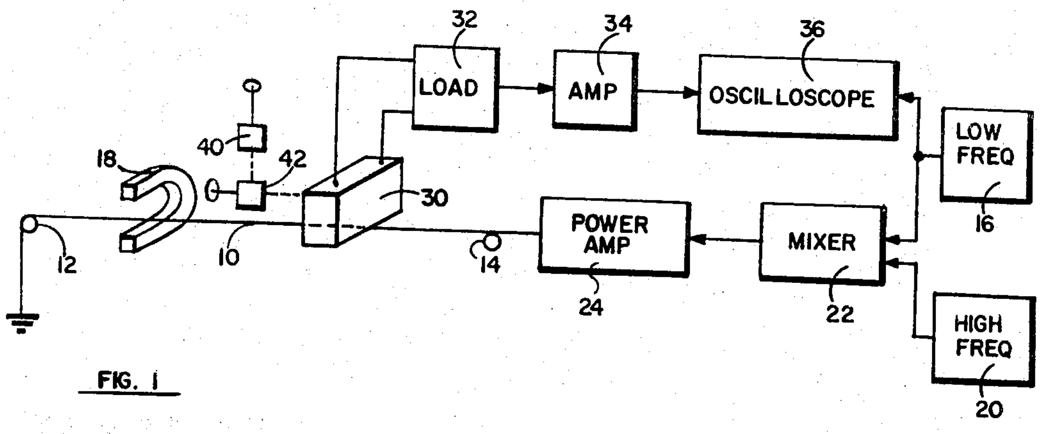
FIGURE 1 is a block diagram of a preferred embodiment of this invention.

Referring to FIGURE 1, the block diagram of the testing apparatus and a magnetic head to be tested are illustrated. A fine wire 10 of non-magnetic material is strung tautly between two posts or supports 12 and 14. Wire tension is made adjustable by use of thumb screws at one or both ends of the wire.

In operation, the wire 10 is set into a vibrating motion at its resonant frequency. Any known method of causing a wire to vibrate may be employed; however, the method preferred is that schematically illustrated which consists of applying a low frequency AC signal from a source 16 to the wire 10 (via a mixer 22 and amplifier 24) and placing a permanent magnet 18 with its north and south poles on opposite sides of the wire 10. The frequency of the signal source 16 should be selected or adjusted to be approximately equal to the fundamental resonant frequency of the wire 10 or its harmonics.

For testing purposes it is desirable to set the vibration frequency of the wire 10 so that the maximum velocity of the wire past the magnetic head aproximately equals the surface velocity of the recording medium intended to be used.

To complete the simulation of magnetic information stored on a moving record medium, a varying magnetic flux pattern eminating from the wire is produced by impressing a high frequency signal from a source 20 on the wire 10 through the mixer 22 and power amplifier 24.

A magnetic head 30 to be tested is placed with its gap centered near the wire 10 while the wire is in its neutral position. The head is connected to a proper load impedance 32, which is equivalent to the input impedance of a head selecting or switching network that normally follows a head. The output signal from the load 32 is coupled through an amplifier 34 to an oscilloscope 36. The low frequency source 16 is also connected to the oscilloscope 36 for the purpose of synchronizing its operation with the vibration of the wire 10.

The vibration of the wire 10 may be initiated into one of two modes, one being rotational and the other translational. The mode is determined by the position of the permanent magnet 18 with respect to the wire 10. If the wire 10 is essential between the poles of the magnet 18, it vibrates in the translational mode. If the magnet 18 is somewhat displaced, the wire 10 assumes the rotational mode of vibration.

The magnetic head 30 responds to the magnetic flux changes about the vibrating wire 10 in the same manner as to the magnetic flux pattern on a recording medium moving past the gap. The response of the head 30 is displayed on the oscilloscope 36. By comparing the displayed response of a particular head being tested to those of known good heads, it can be determined whether the head being tested has an overall acceptable response or must be rejected, Adjustable mounts 40 and 42 upon which the magnetic head 30 is fastened provide for precise positioning of the gap of the head 30 with respect to the wire 10, FIGURE 2 shows an embodiment of the present invention. Two post supports 12 and 14 are mounted upon a firm base 44 between which the thin wire 10 is strung tightly. At one end of the wire the permanent magnet 18 is fastened to the base 44 by a movable block 25 so that the magnet may be selectively positioned near the wire 10. The magnet is fastened to the block 25 by adjustable clamps not shown.

The magnetic head 30 to be tested is connected to a slidable mount 40 which is adjustable horizontally in a direction perpendicular to the wire 10. The mount 40 is in turn adjustable in a vertical direction by means of adjusting screws 45 which adjust the position of the mount 42 relative to a mount 46 which is adjustable in a direction parallel with the wire 10.

Both the signal sources which would be connected to the wire 10 and the response detecting oscilloscope which would be connected to the magnetic head 30 shown in FIGURE 1 are not shown in FIGURE 2.

FIGURES 3 and 4 illustrate the relationship of the vibrating wire 10 to different types of commonly used magnetic heads. The C-core head 30 of FIGURE 3 responds to a horizontal recording on a record medium as the magnetic flux passes in a relatively horizontal path from one side of the gap to the other. The circular arrows about the wire 10 represent the alternating magnetic flux produced around the wire 10 by a high frequency AC signal applied to the wire as shown in FIGURE 1.

The magnetic head 30′ is a schematic illustration of a double-gap type which, for practical purposes, may be considered as a single gap completely surrounding the center pole tip 50. When mounted for testing the pole tip 50 would be centered near the wire 10. As the wire vibrates to either side of the pole tip 50 a separate response for the gap on each side is displayed in the oscilloscope 36 of FIGURE 1.

The double-gap type head is employed for recording in essentially a perpendicular manner, in contrast with the transverse recording manner of the more conventional C-core head.

For a detailed description of the construction of such a magnetic head, reference should be made to Patent 2,846,517, entitled, Magnetic Head, granted Aug. 5, 1958, to W. A. Farrand et al. Briefly, such a head consists of a coil wound around a metal core formed of at least T-shaped laminations, and two low-loss magnetic blocks shaped to form a shielding core extension around the pole tip 50. The blocks are schematically represented in FIGURE 4 as poles 51 and 52 which form two gaps, one on each side of the pole tip 50 along the line of relative motion between the head and the record medium which is here being simulated by the vibrating wire. The head senses only the changes in the magnetic flux just as in actual practice it senses only the changes in the magnetized state of the recording medium by responding to the changing flux pattern as the head scans the perpendicularly recorded signals.

FIGURES 5, 6 and 7 are examples of the response, as displayed on an oscilloscope, of three magnetic heads of varying quality. FIGURES 5 and 7 illustrate the envelope of the signal response from double-gap magnetic heads with the vibrating wire passing the gaps in a rotational mode. FIGURE 6 shows the response from a double-gap head with the wire vibrating in the translational mode.

FIGURE 5 is an example of a recorded response from an acceptable magnetic head. A single pass of the wire across the gaps of the head generates the two envelopes 60 and 61 each of which represents the response of an individual gap. The most obvious characteristic of this head is the balanced response of the individual gaps to the particular frequency being used. The peaks 62 and 63, which are of sufficient and almost identical amplitude, indicate the sensitivity of the gaps. It should be noted that sensitivity is not measured in an absolute sense but in relation to the sensitivity of a standard head.

The peaks 62 and 63 around the center represent the responses of the two gaps on both sides of a center pole piece. The sharp clip at point 65 is the magnetic center of the head. Since the peaks show where the maximum signal occurs, the distance between the peaks can be closely correlated with the pulse width reading characteristics.

The physical center of the head often does not correspond with the magnetic center. Without some measured indication of the displacement of the magnetic center from the physical center the head will be mounted into place in an operative magnetic disc or drum memory system strictly on the basis of an optical estimate of its physical center. Since the magnetic center of the head is represented by the point 65 where the two envelopes 60 and 61 merge, the magnetic center can be correlated to the physical center by centering the grid of the oscilloscope between the two nodes 66 and 67 of the envelopes 60 and 61 and then measuring the lateral displacement of the point 65 from the vertical grid center line.

The present invention allows a determination of the head-to-record medium separation characteristics. The response of the magnetic head can be observed as the distance between the wire and the gaps is increased thereby determining the maximum acceptable separation. If a head functions well only at a very minimum of separation it must be rejected, since such a close tolerance may result in permanent damage to the moving recording medium and the head should they come into contact.

To obtain a complete picture of the operating characteristics of a magnetic head, the head must be examined over the entire range of frequencies at which it is desired to be operated. The balanced response shown in FIGURE 5 may exist at only one short span of operating frequency, or the head sensitivity may be good at one position of the range and poor at another. The present invention provides a quick and expedient method of analyzing the important characteristics which determine the acceptability of a magnetic head for a particular dynamic function.

FIGURE 6 shows, by way of contrast, the shape of the envelope pattern recorded when a translational scan of the gaps is made. Since the wire vibrates in a single plane, nodes of minimum response, such as 66 and 67 in FIGURE 5 do not appear. The magnetic head being tested would be rated as an average acceptable one since the overall sensitivity is good, but as is apparent from the two peaks 70 and 71, the two gaps do not respond equally and the magnetic center does not correspond with the physical center of the head.

FIGURE 7 shows the response of an unacceptable head. The sensitivity of both gaps is insufficient and one of them shows very little sensitivity. The envelopes here result from a rotational scan of the gaps. Such a head could not be used at any range of frequencies. It should also be noted that the magnetic center does not correspond with the physical center of the head.

While the principles of the invention have now been made clear in the illustrative embodiments, there will be immediately obvious to those skilled in the art many modifications in structure, arrangements, proportions, and materials used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. Apparatus for testing the dynamic response of a magnetic head comprising a taut wire suspended between two fixed points, means for causing said wire to vibrate between said two points, means connected to said vibrating wire for conducting a current therethrough, means for adjusting the position of a magnetic head under test relative to said wire, and means adapted to be connected to said magnetic head for displaying the response of said head to the magnetic field provided by said current signal through said vibrating wire.

2. Apparatus for testing the dynamic response of a magnetic head comprising a taut wire suspended between two fixed points, means for causing said wire to vibrate between said two points, means connected to said vibrating wire for conducting an alternating current therethrough, means for adjusting the position of a magnetic head under test relative to said wire, and means adapted to be connected to said magnetic head for displaying the response of said head to the magnetic field provided by said alternating current through said vibrating wire.

3. Apparatus for testing the dynamic response of a magnetic head comprising a taut wire suspended between two fixed points, means for providing a constant magnetic field perpendicular to said wire, means connected to said wire for conducting a low frequency alternating current signal therethrough, thereby causing vibration of said wire, means connected to said wire for conducting a high frequency alternating current therethrough to produce a fluctuating magnetic field, means for adjusting the position of a magnetic head under test relative to said wire, and means adapted to be connected to said magnetic head under test for displaying the response of said magnetic head to the fluctuating magnetic field about said vibrating wire.

4. Apparatus for testing the dynamic response of a magnetic head comprising a taut wire suspended between two fixed points, means for providing a constant magnetic field perpendicular to said wire, means connected to said wire for conducting a low frequency alternating current therethrough, said frequency being equal to a resonant vibration frequency of said wire, thereby causing vibration of said wire at said resonant vibration frequency, means connected to said wire for conducting a high frequency alternating current therethrough to produce a fluctuating magnetic field, means for adjusting the position of a magnetic head under test relative to said wire, and means adapted to be connected to said magnetic head under test for displaying the response of said magnetic head to the fluctuating magnetic field about said vibrating wire.

5. A method for testing the dynamic response of a magnetic head with steps comprising conducting a current through a vibrating wire to produce magnetic flux about said wire, adjusting the position of a head under test in relation to said vibrating wire, and measuring the dynamic response of said head to said magnetic flux.

6. A method for testing the dynamic response of a magnetic head with steps comprising conducting a current through a vibrating wire to produce magnetic flux about said wire, adjusting the physical center of a head under test at approximately the center of said vibrating wire in its neutral position, and measuring the response of said head to said magnetic flux.

7. A method for testing the dynamic response of a magnetic head with steps comprising conducting a current through a vibrating wire to produce magnetic flux about said wire, adjusting the position of a head under test in relation to said vibrating wire, measuring the dynamic response of said head under test to said magnetic flux, measuring the dynamic response of a standard head under substantially the same conditions, and comparing the dynamic response of said head under test with the dynamic response of said standard head.

8. A method for testing the dynamic response of a magnetic head with steps comprising conducting a current through a vibrating wire to produce magnetic flux about said wire, adjusting the magnetic center of said head under test at approximately the center of said vibrating wire in its neutral position, measuring the dynamic response of said head under test to said magnetic flux, measuring the dynamic response of a standard head under substantially the same conditions, and comparing the dynamic response of said head under test with the dynamic response of said standard head.

9. A method for testing the dynamic response of a magnetic head with steps comprising supporting a wire between two fixed points, providing a constant magnetic field perpendicular to said wire, conducting a low frequency alternating current through said wire to provide low frequency pulsating magnetic flux about said wire whereby in cooperation with said constant magnetic field said wire is caused to vibrate, conducting a high frequency current through said wire to provide a high frequency pulsating magnetic flux about said wire, adjusting the position of a head under test in relation to said vibrating wire, and measuring the response of said head to the magnetic flux about said vibrating wire.

10. A method for testing the dynamic response of a magnetic head with steps comprising supporting a taut wire between two fixed points, providing a constant magnetic field perpendicular to said wire, conducting a low frequency alternating current through said wire to provide a low frequency pulsating magnetic flux about said wire whereby in cooperation with said constant magnetic field said wire is caused to vibrate, conducting a high frequency current through said wire to provide a high frequency pulsating magnetic flux about said wire, adjusting the magnetic center of a head under test at approximately the center of said vibrating wire in its neutral position, and measuring the response of said head under test to the magnetic flux about said vibrating wire.

11. A method for testing the dynamic response of a magnetic head with steps comprising supporting a taut wire between two fixed points, providing a constant magnetic field perpendicular to said wire, conducting a low frequency alternating current through said wire to provide a low frequency pulsating magnetic flux about said wire whereby in cooperation with said constant magnetic field said wire is caused to vibrate, conducting a high frequency current through said wire to produce high frequency pulsating magnetic flux about said wire, adjusting the position of said head under test in relation to said vibrating wire, measuring the response of said head under test to the magnetic flux about said vibrating wire, measuring the dynamic response of a standard head under substantially the same conditions, and comparing the dynamic response of said head under test with the dynamic response of said standard head.

12. A method for testing the dynamic response of a magnetic head with steps comprising supporting a taut wire between two fixed points, providing a constant magnetic field perpendicular to said wire, conducting a low frequency alternating current through said wire to provide low frequency pulsating magnetic flux about said wire whereby in cooperation with said constant magnetic field said wire is caused to vibrate, conducting a high frequency current signal upon said wire to provide high frequency pulsating magnetic flux about said wire, adjusting the magnetic center of said head under test at approximately the center of said vibrating wire in its neutral position, measuring the response of said head under test to the magnetic flux about said vibrating wire, measuring the dynamic response of a standard head under substantially the same conditions, and comparing the dynamic response of said head under test with the dynamic response of said standard head.

No references cited.

RUDOLPH V. ROLINEC, *Primary Examiner.*

R. J. CORCORAN, *Assistant Examiner.*